United States Patent Office

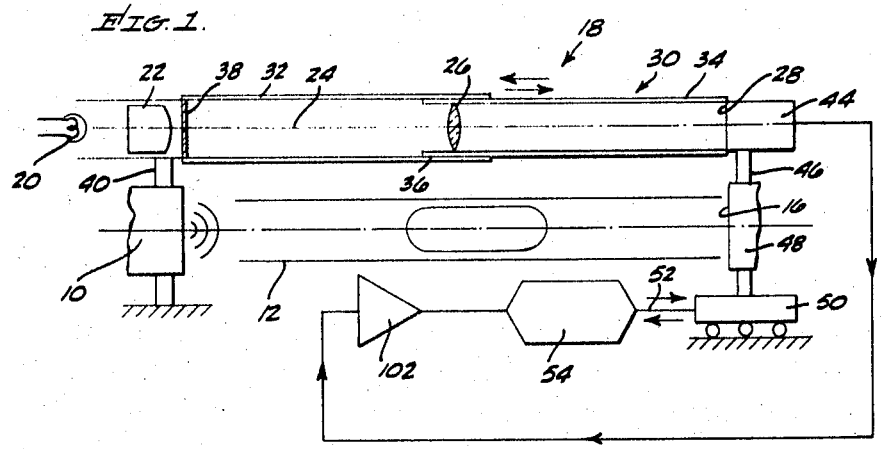
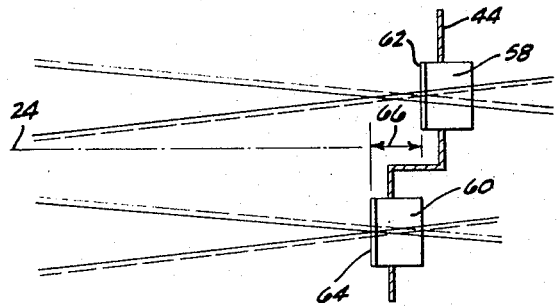
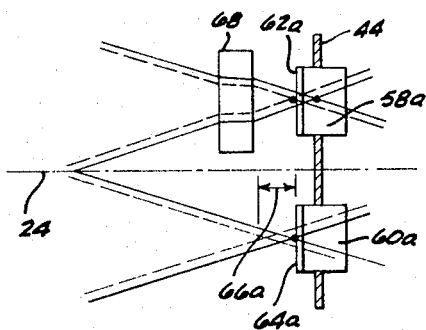

3,454,772
Patented July 8, 1969

3,454,772
PHOTOELECTRIC MONITORING SYSTEM FOR HOLDING THE OBJECT PLANE IN PROPER FOCUS
George G. Vitt, Jr., Los Angeles, and James R. Gaskill, Jr., Playa Del Rey, Calif., assignors to Hughes Aircraft Company, Culver City, Calif., a corporation of Delaware
Filed Dec. 20, 1966, Ser. No. 603,264
Int. Cl. G02b 27/40
U.S. Cl. 250—204                                    9 Claims

ABSTRACT OF THE DISCLOSURE

The arrangement utilizes the nonlinear output response of a pair of photodetecting cells to relate the response to movement of the sensitive surfaces of the cells from a determined position in fixed relation to a plane of best focus of the system. The cells are then arranged integrally in a bridge circuit which translates the variable output of the cells resulting from the noted movement into a signal which indicates the direction and degree of movement of the system from the plane of best focus. The output signal from the circuit may be used to initiate compensatory movement to bring the system into determined relation with the plane of best focus.

---

The invention relates to an apparatus to detect the departure of an optical system from a focused condition and has specific utility in that graduated signals may be generated upon de-focus detection to initiate a proportional return of the optical system to focus condition.

Many commercial uses require an optical system be maintained in accurate focus over extended periods of operation. One such system involves the continuous photographic film monitoring of intelligence displays generated by radar systems. Typically, such a radar system employs a cathode ray tube which visually displays the results of a radar investigation over an extended geographic area. Such systems may be used, for example, in the radar surveillance to determine the movements of aircraft in the air space thereabove. The continuous photographic process maintains a permanent record of the radar investigation. The arrangements usually include the structure now described. The visible display of the radar tube is focused by a main lens on the focal plane of the recording film. The resolution and distinctness of the photographed display are such that the film plane must be accurately located at the focus plane of the lens during all photographic monitoring. It has been found, for example, that structures incorporating the described equipment may move to a de-focused condition as a result of thermal expansion and contraction of the structure in response to relatively minor changes in ambient temperature condition. It will thus be understood that maintaining focus within extremely close tolerances in the noted radar systems and in other devices may be critical.

The present invention utilizes radiation sensitive devices in a novel arrangement which makes the location of the point of focus simple and accurately detects any departure of the system from a focused condition. When defocused a signal is generated proportional to the degree of departure from the focus condition. The signal may be utilized to energize devices to return the structure to a focused condition or to a desired fixed position. Prior art arrangements have also used radiation detection devices for this purpose. One such device is a photoconductive cell. Characteristically, as the sensitive surface of the cell was inadvertently moved from a predetermined location, the electrical output of the cell would vary in proportion to the degree of movement thereof. The prior art arrangements described, however, were intrinsically incapable of accurately determining the direction of de-focus movement without the addition of complicated and expensive circuitry. In short, an identical electrical signal was generated regardless of direction of movement of the photoconductive sensitive surface from the plane of focus as long as the degree of departure was identical.

The present invention has as a primary object an apparatus which utilizes radiation sensitive devices to sense a departure of the system from a focus condition and the direction of that departure.

A further object of the present invention includes secondary means responsive to a generated signal from an appropriate radiation sensitive device which will initiate the required movement to return the system to a focused condition.

It is a specific object of the invention to provide a plurality of photoconductive devices arranged in predetermined relationship to the focus plane of an optical system, said devices being electrically interlocked in an appropriate circuit which creates the capacity of generating electrical signals proportional to the degree and direction of movement of the system from an in-focus condition.

It is yet another object of the invention to provide the photoconductive cell arrangement and electrical circuit as above described wherein a circuit null condition is indicative of system focus.

These and other objects of the invention will become apparent in the course of the following description and from an example of the related drawings wherein:

FIGURE 1 is a partially schematic view showing a typical application of the herein disclosed detecting arrangement associated with a main optical system;

FIG. 2 is a fragmentary partially schematic view showing a first mechanical configuration of an important facet of the detector apparatus;

FIG. 2a is a fragmentary partially schematic view illustrating an alternate mechanical configuration of the apparatus disclosed in FIG. 2.

Figure 4:
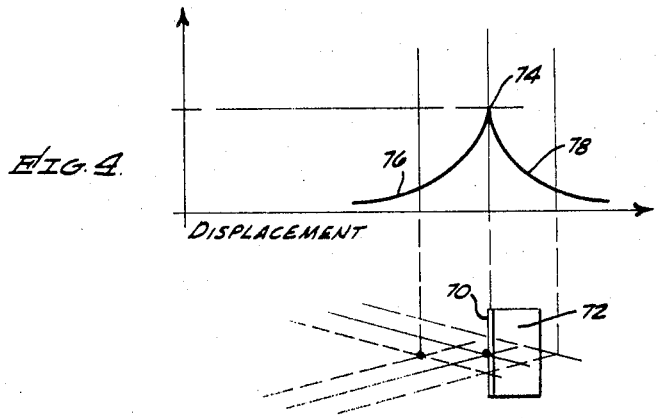
FIG. 4 is a graphic illustration depicting resistance response of a single photoconductive cell to displacement thereof along an optical axis from the point of optical focus.

Describing the invention in detail and directing attention to FIG. 1, the numeral 10 indicates an appropriate light source in a main optical system. The source, as above noted, may be the referred to cathode ray tube in a radar display system. The light image from the main source 10 is projected via main optical system 12 through a main lens 14 to a plane of focus 16. As noted, the plane of focus 16 may carry a photographic film for the continuous monitoring of the visible display emanating from the main source 10. It will therefore be understood that the focal length between the main source 10 and the plane 16 must be accurately maintained over extended time periods.

A focus detector arrangement is indicated generally at 18 and comprises a secondary light source 20, a collimating lens 22 whereby a beam is propagated along an optical axis 24 and through a lens system 26 to a focus plane at 28. The detector arrangement 18 may further comprise a housing 30 which includes a first segment 32 and a second segment 34 movable relative to each other by relative telescopic reception of the segments as at 36. This movement, of course, is parallel to the optical axis 24. From the above description, it will be understood that a focused beam is projected through the housing 30 from the source 20 to the focal plane 28. To effect the operation hereinafter described, the detector arrangement 18 positions a transparency of determined density pattern within the transmitted beam as, for example, at 38. In this embodiment of the invention it is preferred that the transparency 38 be that type known in the art as a "Ronchi Ruling." Persons technically experienced in the optical art will understand that a Ronchi Ruling is a transparency having determined density patterns over its surface, certain of said patterns having uniform opaqueness and other of said patterns having uniform transparency. In effect, the ruling, when placed in a propagated light beam, varies the intensity of transmission of that beam in accurate predetermined area segments. This device enables identical light patterns to be impinged upon the surfaces of a plurality of photoconductive cells, the function of which will be hereinafter described in detail.

Completing the structure in FIG. 1, it will be understood that the segment 32 of the detector apparatus 18 may be physically attached as at 40 to the main light source 10 and that the housing 44 containing the plane of focus 28 may be physically attached as at 46 to a housing 48 containing the plane of focus 16 of the main optical system. The housings 48 and 44 are preferably carried by a movable truck element 50 which is mechanically interlocked as at 52 with an electro-mechanical device 54 which may induce reversible movement of the element 50 and thereby change the position of the focus plane 16 and plane 28. The device 54 may be any common electro-mechanical transducer capable of inducing reversible movement in response to a varying electrical signal, such as, for example, a reversible electric motor, a bi-metallic thermo-electric device or a piezoelectric device.

Attention is directed to FIG. 2 which fragmentarily illustrates details of the housing 44. The housing 44 contains a pair of photoconductive cells 58 and 60 which are physically arranged so that their respective sensitive surfaces 62 and 64 are offset from each other along the optical axis 24 a determined length such as is shown by arrow 66. In the alternate arrangement of FIG. 2a the photoconductive cells 58a and 60a are arranged so that their sensitive surfaces 62a and 64a fall in the same plane but still carried by the housing 44. However, a glass plate 68 is positioned in front of the photoconductive cell 58a and, as a result of light refraction therethrough, there is a change in the optical path length along the optical axis 24 of the beam striking the surface of detector cell 58a. The difference in optical path length is illustrated by the arrow 66a.

Figure 3:
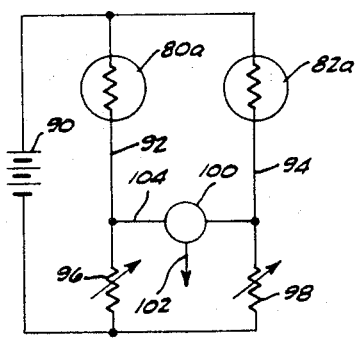
FIG. 3 is a view of a typical circuit that may be used in the disclosed invention.
Figure 3A:
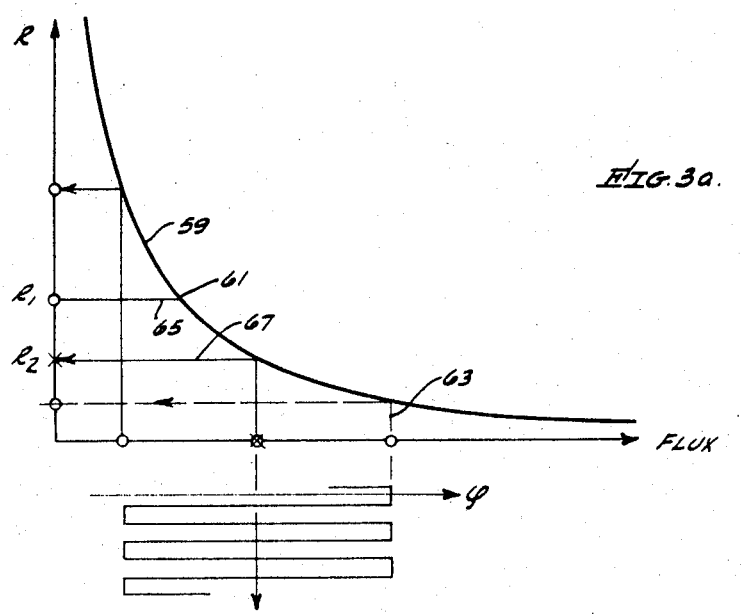
FIG. 3a is a graph showing the resistance output versus flux relationship for a photoconductive cell responding to impinged light from a source of determined contrast.

FIG. 3a is a graph illustrating a typical resistance output of a photoconductive cell in relation to flux impinged light from a source of determined contrast. It will be noted the relationship indicated by line 59 is nonlinear. It will be understood that the Ronchi Ruling provides a contrasted light flux beam which varies from totally opaque as shown by line 61 to totally transparent as indicated by line 63. When the beam is in focus the total resistance of the photocell represents the average of the opaque and transparent segments of the beam as indicated by line 65 having a resistance $R_1$. As the photoconductor is moved away from the focus point, as above described, the resistance of the affected cell falls off rapidly to a resistance corresponding to the average flux level passing through the Ronchi Ruling, i.e., the contrasted flux engaging the cell sensitive surface. This resistance is indicated by the line 67 and has a value $R_2$. Thus, the resistance of a given photoconductive cell falls markedly and nonlinearly as the sensitive surface of the cell is linearly displaced in either direction from the plane of beam focus.

FIG. 4 is a graphic illustration of the variation in resistance as the sensitive surface 70 of a typical photoconductive cell 72 is moved out of the plane of focus of an impinged light beam. The photoconductive cells of FIGS. 2, 2a, 7 and 8 will, of course, function in the manner now being described for cell 72. As shown in FIG. 4, when the surface 70 is positioned at the point of focus of a light beam, the photoconductive cell develops a maximum resistance as indicated by high point 74. As the cell 72 is moved either to the left or to the right from the focal plane, the resistance is uniformly reduced and will be equal for equally spaced distances from the point of focus as shown by points 76 and 78. It will thus be apparent that the resistive drop of the photoconductive cell is directly proportional to the degree of movement from the light beam focus plane and independent of the direction of that movement.

Figure 5:
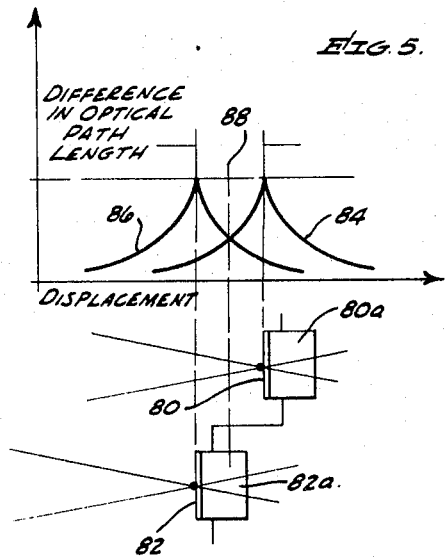
FIG. 5 is a graphic representation of the resistive responses that can be expected from the photoconductive cells shown in mechanical configurations of FIGS. 2 and 2a and FIGS. 7 and 8 as the ensemble is displaced along optical axis.

FIG. 5 illustrates graphically the mechanical configuration of the multiple photoconductive cells described with reference to FIGS. 2 and 2a and relative resistance changes. It is noted that as a result of physical location, the sensitive surfaces 80 and 82 are displaced from each other by a determined distance L parallel to the optical axis. Graph lines 84 and 86 illustrate the variation in each cell resistance as the focus point of the beam is moved relative to the sensitive surfaces 80 and 82. It will now be apparent that if the beam being transmitted along the optical axis is focused at line 88, the resistance of the cells 80a and 82a will be identical. In one instance, the resistance level is determined by the fact that the focal plane of the beam is displaced forwardly of the sensitive surface 80 and in the other instance the resistance is determined by the fact that the focal plane 88 is displaced rearwardly of the sensitive surface 82. Neither cell is located at beam focal plane, i.e., point of maximum resistance. If the focal plane 88 moves from the central position shown toward sensitive surface 80, the resistance of cell 80a will rise and concurrently the resistance of cell 82a will fall as is evidenced by graph lines 84 and 86. Of course, this result assumes that the transparency, i.e., Ronchi Ruling, 38 of FIG. 1 is impinging light patterns of identical brightness on the sensitive surfaces 80 and 82 of the respective cells.

Attention is now directed to FIG. 3, an electrical circuit, designed to provide a signal output responsive to relative movement of a pair of photoconductive cells 80a and 82a with reference to the plane of focus 88 of an impinged beam. The circuit to FIG. 3 provides an electrical power source such as a battery 90 communicating with parallel circuits 92 and 94. For illustrative purposes it will be assumed that the photoconductive cells 80a and 82a are positioned in series in the lines 92 and 94 respectively. The lines 92 and 94 may be provided with manual balancing resistors 96 and 98 to establish a reference position for the circuits. A bridge detector 100 having an output line or signal line 102 is electrically interlocked as at 104 to the circuits 92 and 94.

Assuming the condition shown in FIG. 5 with the focal plane 88 equally spaced from the sensitive surfaces 80 and 82, it will be understood that the resistance of photodetective cells 80a and 82a are equal and the circuit is balanced and there thus is no output from the bridge detector 100. In essence a null condition exists. However, in the event the focal plane 88 moves toward the surface 80, the resistance of detector cell 80a will rise while the resistance of detector cell 82a will fall. As a result an imbalance is created in the circuit of FIG. 3 and a first output signal as a result of current flow from line 94 to line 92 is generated in the bridge detector 100. In the event the focal plane 88 moves toward the sensitive surface 82, the resistance of photoconductive cell 82a is increased while the resistance of cell 80a decreases. As a result, current flows through bridge detector 100 from line 92 to line 94 generating an alternate or second output signal from the detector. The magnitude of the respective signals, of course, will be determined by the degree of displacement from the null condition.

Figure 6:
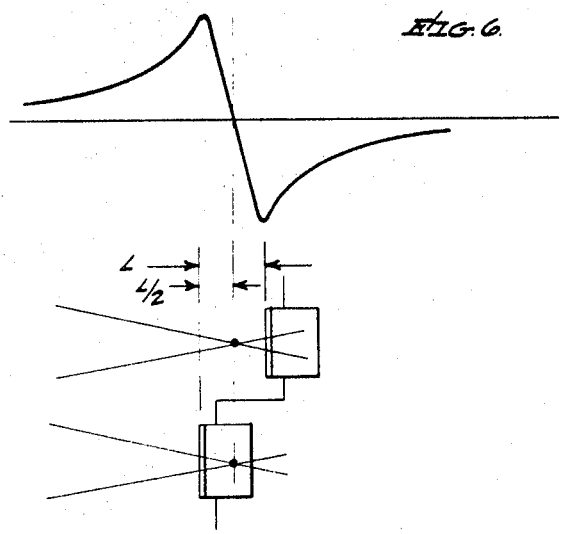
FIG. 6 is a graphic representation of the electrical signal output resulting from the operation of the structure herein disclosed.

Returning to FIG. 1, it will be understood that the light image of the Ronchi Ruling 38 is focused initially on a plane 88 which is represented by sensitive surface 28 of housing 24. In this condition the plane 88 is coplanar with the focus plane 16 of the main optical system and the entire arrangement is in focus. If the arrangement moves out of focus condition, for example, as a result of thermal expansion or contraction of the apparatus the photodetectors carried by housing 44 will generate an output from the bridge detector 100 of determined strength and determined sign depending upon the direction of movement and is shown by the graphic illustration of FIG. 6. The signal output of the bridge detector 100 may be transmitted to an amplification device 102 (FIG. 1) which in turn energizes the electromechanical transducer 54, the latter inducing movement of truck element 50 which shifts the carried focal planes 16 and 28 in an appropriate direction until the signal is halted by arrival at a central or null location (FIG. 6), that is, an electrically balanced condition of the photoconductive cells as shown in FIG. 3. It will be obvious to those skliled in the art that the physical configurations shown in FIGS. 2 and 2a will function identically to that above described as a result of the fact that the sensitive surfaces thereof are displaced relative to the optical length of the beam being impinged thereon.

Figure 7:
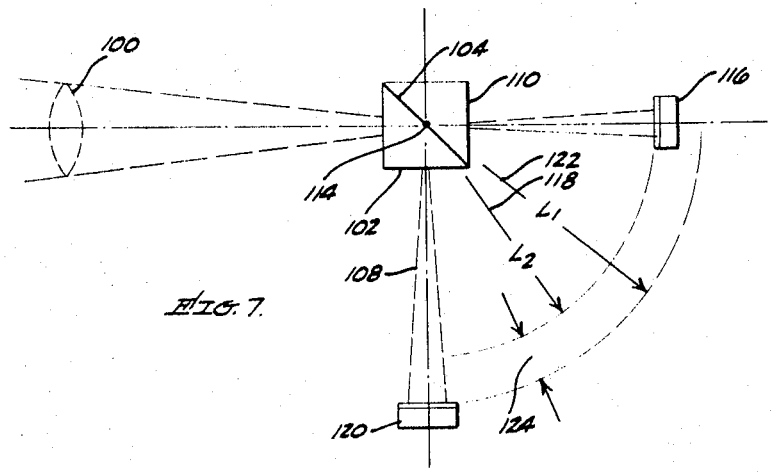
FIG. 7 is a fragmentary view of an alternate detector arrangement that may be employed in the invention.
Figure 8:
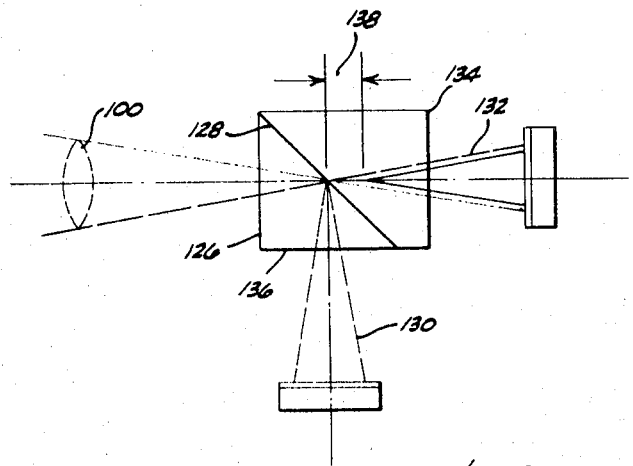
FIG. 8 is yet another fragmentary view of an alternate detector arrangement that may be employed in the invention.

It will be apparent that an important feature of the embodiments described is that each photoconductor produces a determined and repeatable electrical response as it is moved along the detector optical axis a determined distance with reference to the focus plane of the propagated beam. It will also be recalled that the Ronchi Ruling in the optical path resulted in identical contrast patterns being displayed on the sensitive surfaces of the respective photoconductors. FIGS. 7 and 8 illustrate modes of avoiding the use of a Ronchi Ruling.

Assuming a single light source as in the embodiment of FIG. 1, any transparency of uniform contrast may be placed in front of the source. Then a light beam of determined intensity contrast is produced. Thus, a single source image field is indicated in FIG. 7 at 110 which in turn is optically aligned with a beam splitting prism 112. The beam splitting prism has an angular internal surface 114 which will reflect one-half of the beam downwardly from surface 116 as at 118 and accommodate the transmission of the other half of the beam from surface 120 as at 122. The two beams 118 and 122 are thus propagated in 90° angle relation. If we assume a center of radius in the center of prism 112, as at 124, a first photoconductor 126 may be placed in optical alignment with beam 118 at a first radius 128 while a second photodetector 130 may be placed optically within beam 122 on a second radius 132. The difference in optical path lengths between the photodetector 116 and 120 is thus illustrated by line 134.

Still an alternate method of providing optical length difference is illustrated fragmentarily in FIG. 8. Again, a single source image is provided at 110. A beam splitting prism 136 is provided having reflecting and transmitting surface 138 therein. Reflecting surface 138 propagates one-half of the entering beam downwardly as at 140 by reflection and the other half of the beam is propagated along the original beam axis as at 142 by transmission. However, the prism 126 has a longer optical path output at surface 144 than at surface 146. This results in a difference in optical path length as shown by line 148.

Thus, the structures of FIGS. 7 and 8 achieve a variable optical path length to the respective photoconductors. In operation, of course, the structures of FIGS. 7 and 8 function identically as the structures of FIGS. 2 and 2a when coupled in a circuit as shown in FIG. 3. Thus, the configuration of FIGS. 7 and 8 may be efficiently substituted for the configurations shown in FIGS. 2 and 2a and the requirement of a Ronchi Ruling utilized in the embodiments of FIGS. 2 and 2a is eliminated.

Figure 9:
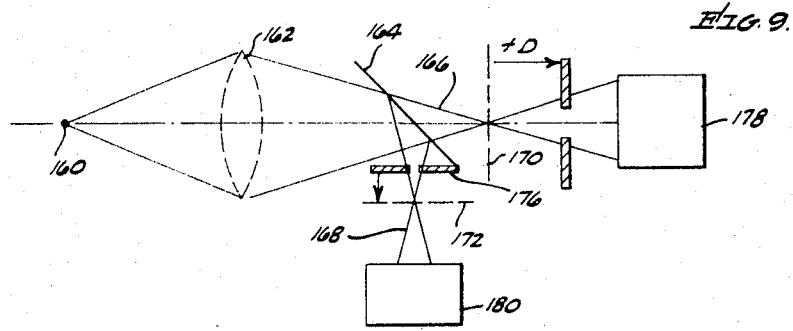
FIG. 9 is a fragmentary view of yet another alternate optical-detector arrangement that may be employed in the invention.
Figure 9A:
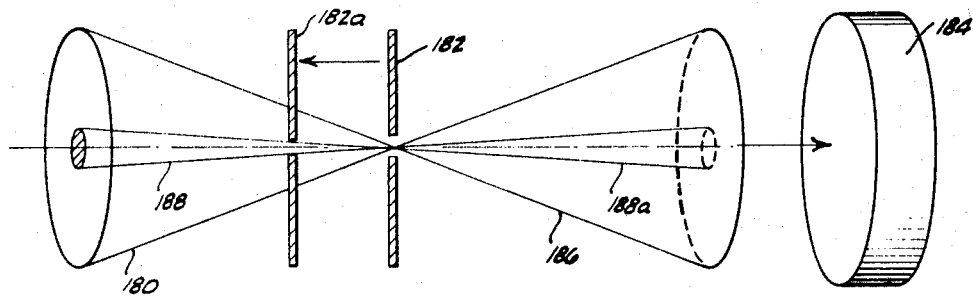
FIG. 9a is a schematic view illustrating the tranmitted flux variation of the operative device shown in FIG. 9.

Attention is directed to FIG. 9 which illustrates an arrangement wherein a single point source of light without utilizing an interposed contrast filter may be employed. As shown in FIG. 9, the point light source is indicated by numeral 160, the beam emanates therefrom to a converging lens 162 which focuses the beam through a beam splitting prism indicated by line 164, the latter splitting the beam into perpendicularly arranged segments 166 and 168. The beam 166 is provided with a plane of best focus as at 170 whereas the beam 168 is provided with a plane of best focus at 172. Limiting apertures 174 and 176 are provided in the respective beams 166 and 168. Photoconductors 178 and 180 are arranged to receive the respective beams 166 and 168. With the beam limiting apertures 174 and 176 located at the plane of best focus, it will be apparent that the entire light or flux transmitted from source 160 is impinged on the respective photodetectors at 178 and 180 and as a consequence the resistance output thereof of maximum value is achieved. However, in the event the system moves out of focus, that is, the beam limiting apertures 174 and 176 are moved a distance D away from the respective planes of best focus, the total flux transmitted to the respective photodetector cells is sharply reduced. This result is graphically illustrated in FIG. 9a wherein a light flux beam is indicated at 180 having a plane of best focus at the limiting aperture plate 182. When the aperture plate 182 is located in this plane, the entire light flux is transmitted to the related photodetector 184 as indicated by beam cone 186. However, in the event the arrangement moves out of focus, the net effect is to move the beam limiting aperture plate 182 to a position 182a which restricts the total flux transmitted to the beam cones indicated by 188 and 188a. It will thus be apparent that the total flux impinged upon photodetector 184 is sharply reduced which in turn varies the resistance output thereof.

Employing this structure, it is merely necessary to provide variable optical path lengths to the photodetectors 178 and 180 and achieve the nonlinear resistance output and variable effect of the prior embodiments and without utilizing a beam of determined flux contrast.

The invention as disclosed provides a unique mode of accurately sensing the departure of a focused radiated beam from its physical point of focus with reference to the supporting structure. In addition to determining the fact of departure from point of focus, the arrangement additionally indicates the direction of departure and therefore provides a mode of initiating an error signal proportional to both the direction and degree of departure which may be transduced or translated into an appropriate correcting action and thereby automatically bring the structure to the proper focused condition.

The invention as shown is by way of illustration and not limitation and may be modified in many particulars all within the spirit thereof.

What is claimed is:
1. In an apparatus to determine the focus position of an optical system,
- a source of radiation,
- a plurality of radiation sensitive devices,
- means to diffuse said radiation source and provide a beam therefrom of varying cross-sectional contrast,
- optical means to impinge the beam on said devices,
- the optical path lengths between said radiation source and said devices being unequal,
- and control means associated with said devices operative to generate a signal in response to variations in said optical path lengths.

2. An apparatus to determine the focus position of an optical system according to claim 1,
- wherein said radiation source is a source of illumination,
- said devices being photoelectrical transducers having electrical characteristics variable in response to the amount of illumination impinging thereon,
- said control means comprising an electrical circuit interlocked with said transducers and operative to generate an electrical signal in response to variation in said characteristics.

3. An apparatus to determine the focus position of an optical system according to claim 2,
- wherein said transducers are photoconductive cells,
- the electrical resistance of said cells being variable in response to the amount of illumination impinging thereon,
- said circuit comprising a source of electricity,
- parallel electrical lines having the respective cells in series therein and connected to said source of electricity,
- and an output signal generator interconnecting said parallel lines to provide an electrical signal output in response to an imbalance in the resistance of said cells.

4. An apparatus to determine the focus position of an optical system according to claim 3,
- wherein said photoconductive cells are spaced from each other along the optical path of said beam.

5. In an apparatus to determine the focus position of an optical system according to claim 3,
- wherein said photoconductive cells have illumination sensitive surfaces falling within the same plane,
- and means positioned in front of the sensitive surface of one of said cells to change the optical path length of the beam impinging thereon.

6. An apparatus to determine the focus position of an optical system according to claim 4,
- wherein said means to diffuse comprises Ronchi Ruling means in optical series in said beam.

7. An apparatus to determine the focus position of an optical system according to claim 4,
- wherein said optical means comprises a beam-splitting prism having beam output faces optically aligned with the respective photoconductive cells.

8. An apparatus to determine the focus position of an optical system according to claim 3,
- and including another transducer device operative to induce movement of said cells in response to said electrical signal from said generator,
- said movement being operative to return said cells to a resistance balanced condition in said circuit.

9. An apparatus to determine the focus position of an optical system according to claim 7,
- wherein said means to diffuse comprises a single transparency placed in the optical path of said beam, said transparency being of variable contrast over the surface thereof.

References Cited

UNITED STATES PATENTS

| | | | |
|---|---|---|---|
| 2,968,994 | 1/1961 | Shurcliff | 250—204 X |
| 3,056,330 | 10/1962 | Saunderson et al. | 250—204 X |
| 3,093,778 | 6/1963 | Tidwell | 250—204 X |

JAMES W. LAWRENCE, *Primary Examiner.*

C. R. CAMPBELL, *Assistant Examiner.*

U.S. Cl. X.R.

250—208, 209, 210, 234; 350—46

Notice of Adverse Decisions in Interferences

In Interference No. 97,644 involving Patent No. 3,454,772, G. G. Vitt, Jr., and J. R. Gaskill, Jr., PHOTOELECTRIC MONITORING SYSTEM FOR HOLDING THE OBJECT PLANE IN PROPER FOCUS, final judgment adverse to the patentees was rendered Mar. 27, 1973, as to claims 1-9.

[*Official Gazette July 10, 1973.*]